(12) United States Patent
Sun et al.

(10) Patent No.: US 10,430,329 B2
(45) Date of Patent: Oct. 1, 2019

(54) QUALITY OF SERVICE AWARE STORAGE CLASS MEMORY/NAND FLASH HYBRID SOLID STATE DRIVE

(71) Applicant: Western Digital Technologies, Inc., San Jose, CA (US)

(72) Inventors: Chao Sun, San Jose, CA (US); Adam Manzanares, Newark, CA (US); Minghai Qin, Milpitas, CA (US); Dejan Vucinic, San Jose, CA (US); Frank R. Chu, Milpitas, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/631,034

(22) Filed: Jun. 23, 2017

(65) Prior Publication Data

US 2018/0373626 A1 Dec. 27, 2018

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/068* (2013.01); *G06F 3/0631* (2013.01); *G06F 3/0637* (2013.01); *G06F 3/0649* (2013.01); *G06F 3/0653* (2013.01); *G06F 3/0679* (2013.01); *G06F 3/0685* (2013.01)

(58) Field of Classification Search
CPC .... G06F 12/0246; G06F 3/061; G06F 3/0631; G06F 3/0649; G06F 3/0685; G06F 3/0637; G06F 3/0653; G06F 12/02; G06F 3/06
USPC .................................................. 711/103, 114
See application file for complete search history.

(56) References Cited

U.S. PATENT DOCUMENTS

| | | | |
|---|---|---|---|
| 8,751,725 B1 * | 6/2014 | Gangadharan | G06F 12/0638 711/100 |
| 2008/0209112 A1 * | 8/2008 | Yu | G06F 12/0246 711/103 |
| 2008/0215800 A1 * | 9/2008 | Lee | G06F 3/0613 711/103 |
| 2014/0244898 A1 * | 8/2014 | Liu | G06F 12/126 711/103 |
| 2015/0081955 A1 * | 3/2015 | Vucinic | G06F 13/4282 711/103 |
| 2016/0179614 A1 * | 6/2016 | Camp | G06F 11/1012 714/766 |
| 2017/0228191 A1 | 8/2017 | Sun et al. | |
| 2017/0371559 A1 * | 12/2017 | Higgins | G06F 3/0611 |
| 2018/0011527 A1 * | 1/2018 | Kim | G06F 3/0614 |

* cited by examiner

*Primary Examiner* — Pierre Miche Bataille
(74) *Attorney, Agent, or Firm* — Patterson & Sheridan, LLP; Steven H. Versteeg

(57) ABSTRACT

A device having a controller configured to interface with a host, a storage class memory configured to interface with the controller and a flash memory configured to interface with the controller, wherein both the storage class memory and the flash memory are configured to store data, and wherein the controller is configured to separate the data according to latency critical data and non-latency critical data.

19 Claims, 6 Drawing Sheets

Command attributes

- Specify a set of rules in SSD controller to determine eviction victims in SCM
- Attributes: read/write (cmd type), seq./random (vary judgement by FTL impl. Such as 4K, 32K etc.), access latency (low/no strict requirement), frequent read/infrequent read, frequent write/infrequent write etc.
- Attribute code (e.g. 8bits), bit marks showing IO characteristics, obtained from DSM parsing
- With attribute code, performance could be optimized by right data placement

| | R/W | Seq/Rand. | Latency | Read Freq. | WR Freq. | Read Future | Write Future | Reserved |
|---|---|---|---|---|---|---|---|---|
| 1 | R | Seq. | Low | High | High | True | True | |
| 0 | W | Rand. | High | Low | Low | False | False | |

FIG. 5

QUALITY OF SERVICE AWARE STORAGE CLASS MEMORY/NAND FLASH HYBRID SOLID STATE DRIVE

BACKGROUND OF THE DISCLOSURE

Field of the Disclosure

Aspects of the disclosure relate to solid state drive (SSD) technology. More specifically, aspects of the disclosure relate to providing high bandwidth and low latency storage mechanisms and methods with high quality of service capabilities.

Description of the Related Art

As technology increases, there is a greater demand for high speed processing of data. High-speed data processing is performed through computers which are designed and/or adapted to provide a high storage input/output (I/O) performance. Users experience is important as even the highest-speed processing systems do not always provide the user with an overall speed desired. Such user experiences are generally known in the industry as having quality of service (QoS) issues. Quality of service is commonly defined as the overall performance of a computer system as seen by the user. Measures of the quality of service may take into account such data as error rates, bit rates, transmission delay and throughput. In terms of QoS, SSDs and mechanisms have several advantages compared to conventional storage technologies, (i.e., magnetic disk drive systems). These solid state drive systems can offer faster reading and writing capabilities compared to conventional magnetic systems, however some solid state drive advantages are not fully exploited. As a result, even if systems use this technology, they may not be optimal for users.

Magnetic disk drive systems, for example RAID storage systems, use a physical mapping mechanism for writing and reading data. With RAID storage systems, logical blocks are statically mapped to actual physical magnetic storage locations on a disk system. Such RAID systems can perform with some efficiency if the disk system is properly mapped. Unfortunately, most RAID systems have physical mapping that is less than optimal and such improper layout hampers writing and reading of data. Additionally, when data needs to be accessed immediately, magnetic drive systems may have drawbacks due in part to long access times.

SSDs use a different mapping mechanism for writing and reading of data. SDD capable systems are based upon flash memory. An array of flash memory packages may be integrated into SSD capable systems wherein these flash memory packages are connected through multiple channels. The number of channels may vary according to the application. The typical number of channels can vary from one (1) to thirty two (32). This number of channels can greatly increase the efficiency of the SSD in operation. The number of channels, often referred to as "internal parallelism", is generally not exploited to the fullest measure possible in standard SSD systems. Compared to the physical mapping that occurs on RAID systems, SSD systems dynamically map logical blocks for the system. The dynamic map is generally much more efficient compared to the physical mapping systems that are used on a RAID storage system.

The lack of use of all of the advantages of internal parallelism in SSD operation can result in specific bottlenecks or jams occurring at various points in computer and/or storage architecture. As a non-limiting example, for read operations, multiple read requests to the same die can cause quality of service issues as the time interval between an initial request and actual response can be large as requests stack up and wait to be executed at a single die. Meanwhile, other die in a system architecture may have no running operations, thereby hampering the overall efficiency of the system because these dies are not performing functions. As a result, SSD operation is only as efficient as the mapping capability provided. SSD have relatively high costs compared to magnetic disk systems, therefore economics may force consumers to use conventional magnetic disk technology.

Drive manufacturers have created a third type of drive for use in computing systems. Hybrid SSD systems use components of each of the SSD system and the conventional disk system or have other configurations, such as those with storage class memory and flash memory in order to attain other advantages. In other systems, a storage medium, such as a NAND flash solid state drive is combined with a conventional hard disk drive to offer the advantages of each of the systems.

As time has progressed there has been a greater need for industry standards to be created to maximize the benefits of non-volatile memory systems, such as flash memory systems. Non-volatile memory systems are defined herein as memory systems that retain data that can be retrieved at a later time even after a loss of electricity, such as from turning a computer off. Ever evolving industry standards are placing a premium on high bandwidth and low latency capacity storage systems that may interface with today's computers and equipment as well as those in the future.

There is a need to have a hybrid SSD that can benefit from flash memory advantages and to be able to exceed improving industry standards. There is a further need to provide a hybrid SSD that will increase the efficiency at which computer operations are performed while maintaining relatively low cost. There is also a need to provide for an overall quality of service improvement of hybrid SSD systems for enhancement of computer system efficiency. There is an additional need for provide a hybrid SSD that better utilizes internal parallelism to balance workload requests within the overall drive.

SUMMARY

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one non-limiting embodiment, a device is disclosed. The device has a controller configured to interface with a host, and a storage class memory configured to interface with the controller and a flash memory configured to interface with the controller, wherein both the storage class memory and the flash memory are configured to store data and wherein the controller is configured to separate the data according to latency critical data and non-latency critical data.

In another non-limiting embodiment, a method for reading data is disclosed. The method provides for receiving a read command from a host, reading data from a memory, determining if the data has a low latency data set management hint, storing the data in a flash memory when the data does not have a low latency data set management hint and storing the data in a storage class memory when the data has a low latency data set management hint.

In another non-limiting embodiment, a method for writing data is disclosed. This method provides for receiving a write command from a host, determining if the data has a low latency data set management hint, writing the data in a flash memory when the data does not have a low latency data set management hint, determining a presence of unused memory over a size of the write data in both the flash memory and a storage class memory, moving a set of data from the storage class memory to the flash memory when a replacement algorithm determines an eviction proceeding and the flash memory and the storage class memory are full and writing the data in the storage class memory when the data has a low latency data set management hint.

In another non-limiting embodiment, a method is provided entailing checking an attribution code of data in a first memory, and moving the data from the first memory to a second memory when the attribution code indicates that the data is required to be stored in a memory with specific attributes and the second memory has the specific attributes compared to the first memory.

In another non-limiting embodiment, a device is provided having means for receiving a write command from a host, means for determining when data has a low latency data set management hint; means for writing the data in a flash memory when the data does not have a low latency data set management hint, means for determining a presence of unused memory over a size of the write data in both the flash memory and a storage class memory, means for moving a set of data from the storage class memory to the flash memory when a replacement algorithm determines an eviction proceeding and the flash memory and the storage class memory are full and means for writing the data in the storage class memory when the data has a low latency data set management hint.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a table of command attributes for an SSD controller for a hybrid SSD for quality of service capabilities.

DETAILED DESCRIPTION

Figure 1:
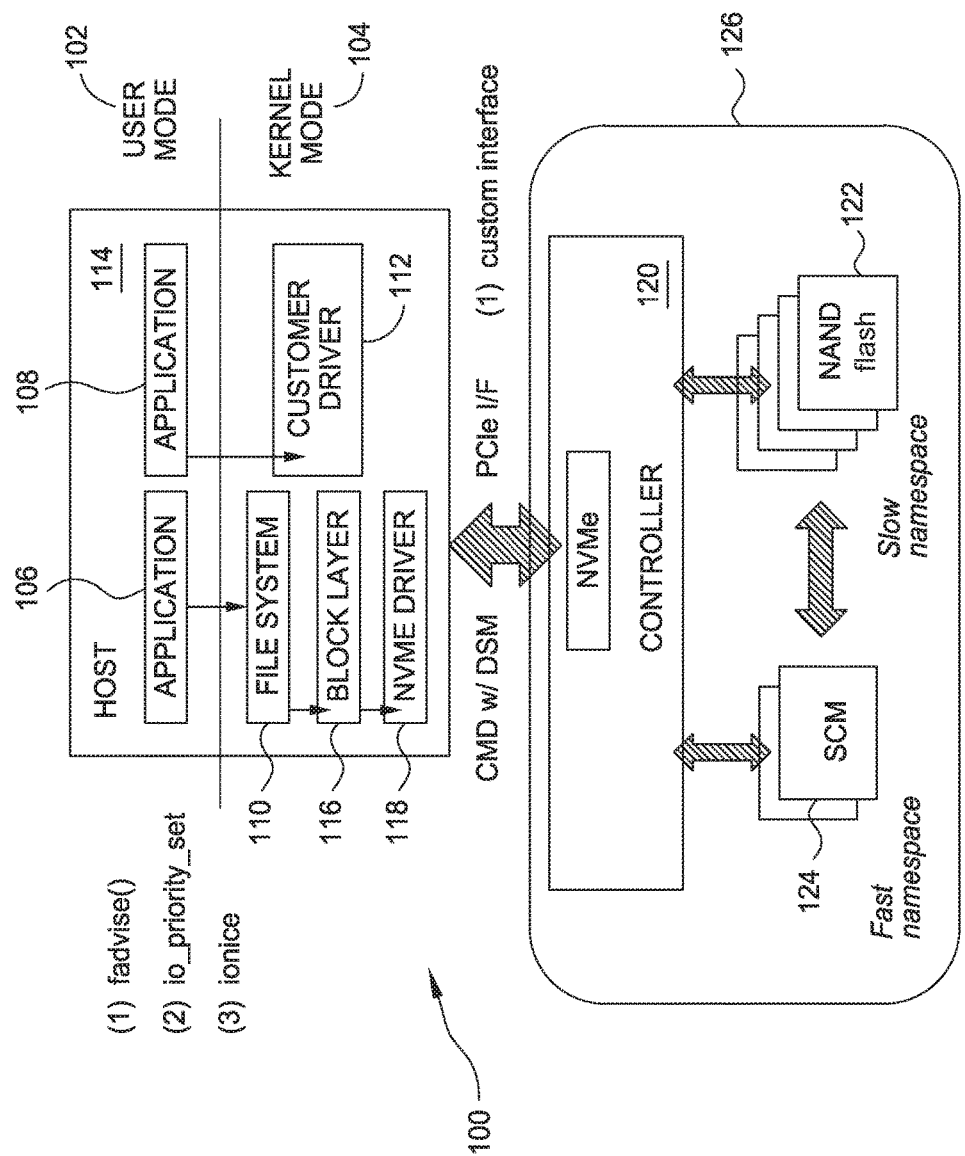
FIG. 1 is a first example embodiment of a SCM/NAND Flash hybrid SSD with host hint assisted data placement.

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in the claims. Likewise, reference to "the disclosure" shall not be construed as a generalization of any inventive subject matter disclosed herein and shall not be considered to be an element or limitation of the appended claims except where explicitly recited in a claim.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

A hybrid SSD is disclosed herein. The hybrid SSD uses elements from storage class memory and combines SSD flash drive components. The flash drive components, in one non-limiting embodiment a NAND flash drive, is used to store data that is less commonly used by a computer system or for longer term storage where latency does not affect user operability. By using the flash memory components for higher latency storage, appropriate classes of storage, in one embodiment storage class memory (SCM) may be used for respective low-latency data. The configurations and methods provided by the hybrid SSD described herein, are provided to allow for a higher quality of service for the user.

In the non-limiting embodiment, storage class memory may also be used in the configuration described. For the purposes of definition, the storage class memory may include resistive random access memory (ReRam), phase change memory (PCM), magneto-resistive random access memory (MRAM) or other emerging non-volatile memory (NVM). The SCM may have features of a 100 ns latency and greater than $10^7$ P/E cycles where a P/E cycle is a sequence of events in which data is written to a memory cell, then erased and then rewritten. The SCM used in these configurations may be used in both a storage capacity and as a non-volatile cache system.

Referring to FIG. 1 and in light of the above description, in one example embodiment, storage class memory/NAND Flash hybrid SSD with host hint assisted data placement schematic system 100 is illustrated, wherein the system 100 includes both a host 114 and a storage device 126. As will be seen through the disclosure, the device 126 may be a stand alone system and may be connected and/or disconnected to the host by a user. A schematic of the system 100 has a defined user mode 102 and kernel mode 104. In FIG. 1, the kernel mode 104 may be constructed, at least in part, through the use of a LINUX computer operating system. As will be understood, although the schematic may involve the use of a LINUX computer operating system, other computer operating systems, such as Windows, IOs, as non-limiting examples, may be used. For the purposes of description, the portion of the schematic identified as a kernel mode 104, may also be referred to as a system mode. Kernel mode 104, as is known in the art, is one of two modes of operation of a central processing unit in the Linux operating system. The second of the two operating modes is the defined user mode 102 that is a non-privileged mode for user programs. This non-privileged user mode 102 is for all other mode operations other than kernel mode 104 described above.

Applications 106, 108 may be constructed in the non-privileged user mode 102 to allow data to be provided to either a file system 110 or a custom driver 112. These applications 106, 108 although shown as two separate applications, could be configured as one application or more than two applications. The applications 106, 108 may be operatively connected to the file system 110 and/or the custom driver 112 as necessary. The applications 106, 108 may be constructed for ease of operation through the use of IONICE, a web based top open source mobile SDK for developing web based applications. The applications, for example could be based on a personal computer, tablet, mobile phone or a server as non-limiting embodiments and generally defined as the host 114. In the embodiment illustrated, data may be transferred from the applications 106, 108 to the respective file system 110 and/or custom driver 112 through fadvise, a command that gives file advisory information to an operating system. In the kernel mode 104, such commands may be received and acted upon by a processor (not shown) to perform necessary operations within the host 114. For the purposes of description, the host 114 is a computer that is designed to mediate access or multiple accesses to a data base or data base that is mounted on or connected to the host 114. The host 114 may be a stand-alone system or may be connected to other computers or devices as part of a computer network. In the illustrated embodiment, the host 114 is connected to a device 126 such as a storage class memory/NAND Flash hybrid solid state drive that is configured to have host hinted data placement. The storage class memory 124 and NAND flash memory may have any capacity suitable for use for the storage needs of a particular project.

The host 114 is configured with a block layer 116 configured to receive information (data) from the file system 110. The block layer 116 may be an input/output capable system for storing information. As a non-limiting example embodiment, the block layer 116 may be a hard disk, memory device or other configuration for storing data. The applications 106, 108 may also be configured with the block layer 116 as one unit or the applications 106, 108 may be separate. The data on the block layer 116 may be either sequentially or non-sequentially accessed as necessary by a driver 118. In FIG. 1, the driver 118 is created to receive and/or access the block layer 116 for data. Although depicted as an NVMe driver 118, other protocols may be used, thus using the NVMe standard is but one option that is contemplated. For purposes of definition, the NVMe driver relates to a non-volatile memory host controller interface specification. As provided, such a custom driver 112 other than an NVMe driver 118 may be used. Although shown as having both a NVMe driver 118 and a custom driver 112, other configurations may include only a custom driver 112 replacing both the custom driver 112 and the NVMe driver 118, having multiple custom drivers or having a sole NVMe driver 118.

The driver 118 and/or custom driver 112 may be connected to a controller 120 that is also designed, as a non-limiting example, to NVMe standards. The controller 120 is part of a SCM/NAND flash hybrid SSD device 126. The connection of the driver 118 to the controller 120 or custom driver 112 to the controller 120 may be performed through a distributed shared memory form of memory architecture. Such a configuration allows the NAND flash 122 and/or the storage class memory 124 to be addressed as one logical entity with the block layer 116 or any of the memory components presented in the host 114. The storage class memory 124 may be connected to the NAND flash 122 through any protocol applicable.

In the illustrated embodiment, data traveling to and from the NAND flash 122 and the storage class memory 124 may be identified through a namespace. In the illustrated embodiment, the namespace is a set of symbols that are used to provide an organizational capability so that objects may be identified/referred by name. Although not necessarily required, a hierarchy of naming conventions may be used so that the organizational capability may differentiate between reused names in different situations. The differentiation may be configured such that the fast namespace entities are associated with the storage class memory 124 and the slow namespace entities may be associated with the NAND flash 122. This preference to separate the slow namespace entities and fast namespace entities is but one configuration and should be considered non-limiting. The illustrated embodiment takes advantage of storage class memory 124 capabilities and the overall needs of the host 114 for operation.

The controller 120 may be provided with the hybrid SSD device 126. The controller 120 may be configured to perform individual or several operations at one time. As a non-limiting example, the controller 120 may be configured to perform read and write caching, error detection and correction, bad block mapping and wear leveling. A host interface may also be provided. The host interface may use different protocols for connection of various types of devices. The host interface may be included with the hybrid SSD device 126 or may be considered separate from the hybrid SSD device 126. The host interface may be through PCI Express, Serial ATA, USB, Parallel ATA or SCSI as non-limiting embodiment.

The interface between the controller 120 and the host 114 may be a custom designed interface. This interface may use a user space library to communicate between the device 126 and the host 114. By using data set management (DSM) hints for the interface between the host 114 and the device 126, the overall system 100 may be configured such that latency-critical requests are provided to the storage class memory 124 and other latency-noncritical requests are provided to the NAND flash 122. Such a division between latency critical requests and non-latency critical requests provides an efficiency increase for the system 100 and the device 126. As will be understood, although shown as a NAND flash 112, the storage for non-critical latency data may be configured as a single level cell (SLC), multi-level cell (MLC), triple level cell (TLC) units as non-limiting embodiments.

The interface between the controller 120 and the host 114 may be, for example, a high speed serial computer bus. Such bus may provide a hot-plug functionality, if required, allowing for a modularity of the system 100. Such modularity allows for addition or removal of the device 126 without damaging or ultimately hampering or disturbing the functions being performed by the host 114. The interface may also allow for advanced error reporting (AER) minimizing latency produced through encountered errors. Bus standards for the interface may be PCIe, PCI, PCI-X or AGP bus standards, as non-limiting examples.

While described as using a custom interface using PCIe technology, other interfaces may be used. Such interfaces may be based upon LINUX computing or other operating systems, as non-limiting examples fadvise, io_priority_set, and ionice.

Figure 2:
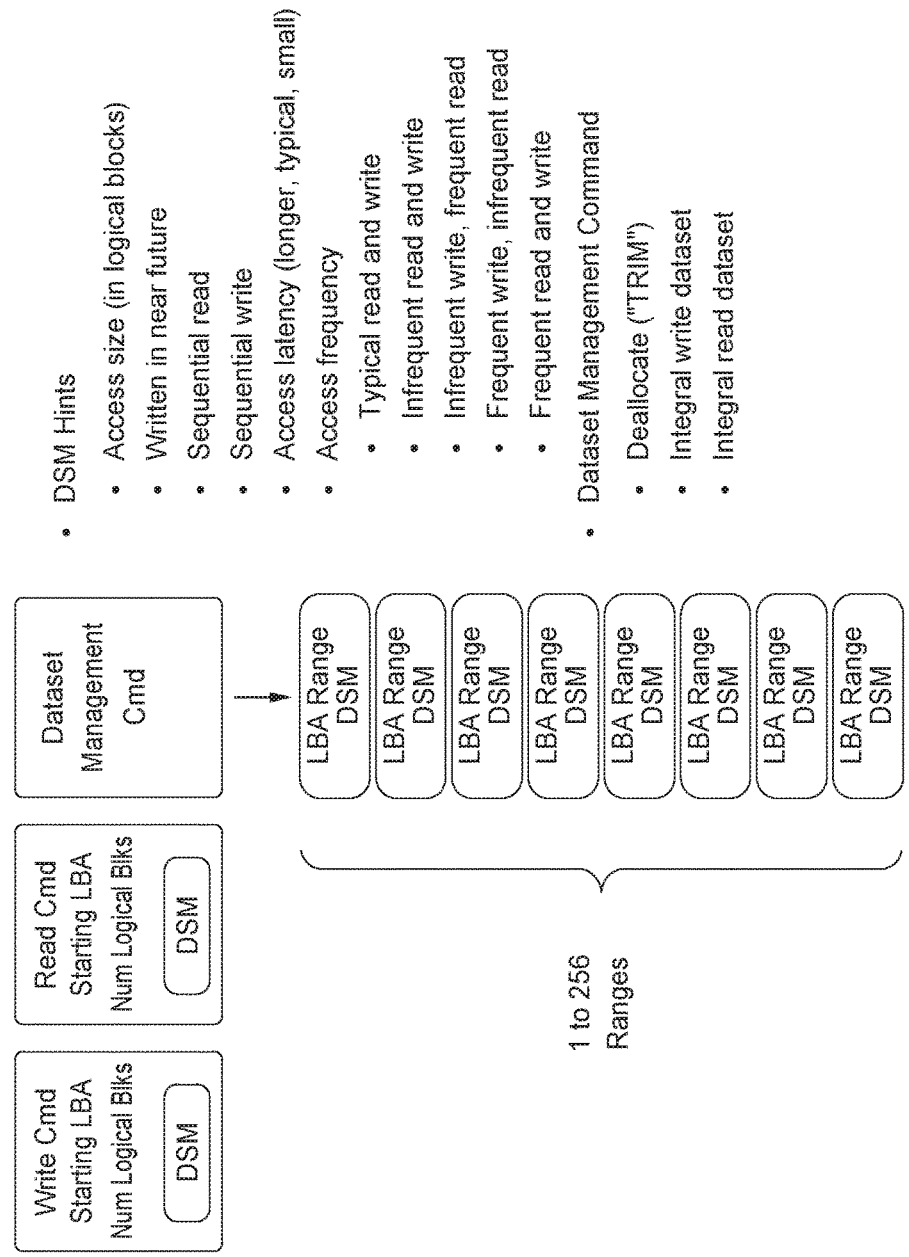
FIG. 2 is an example embodiment of data set management hints for use with the SCM/NAND Flash hybrid SSD of FIG. 1.

Data set management hints may be used with command language over the custom interface between the host 114 and the device 126. These hints, as disclosed in FIG. 2 provide for a logical access system that enhances overall efficiency of the system 100. Referring to FIG. 2, a data set of management hints is provided for use with the embodiment described in FIG. 1. The data set management hints may be access size (in logical blocks), whether the data is to be written in the near future, a sequential read, a sequential write, access latency or access frequency. Access frequency can be a factor in overall efficiency of the system 100. Data that must be accessed quickly and repetitively may be stored in the storage class memory 124 while data that must be accessed more slowly or more infrequently may be stored in the NAND flash 122.

Access frequency, as a data set management hint, may also be subdivided into other categories to allow the system to be more efficient. Subdivisions of access frequency may be, for example, typical read and write designation, infrequent read and write designation, infrequent write-frequent read designation, frequent write-infrequent read designation and frequent read and write designation.

To aid in input-output operations, the applications 106, 108 (application layer) in the host 114 may be used to help predict the nature of the data to be stored in the device 126. The hints or attributes of the data can be used to identify how the data should be stored within the storage class memory 124 and/or the NAND flash 122 through the controller 120. Context attributes, for example may be applied to logical block addressing ranges to identify a data set. As illustrated in FIGS. 2, 1 to 256 ranges may be used. These context attributes may be used to help the controller 120 determine how the data set should be filed within the storage class memory 124 and/or the NAND flash 122. Dataset management commands may also use an integral write dataset and/or an integral read dataset.

Figure 3:
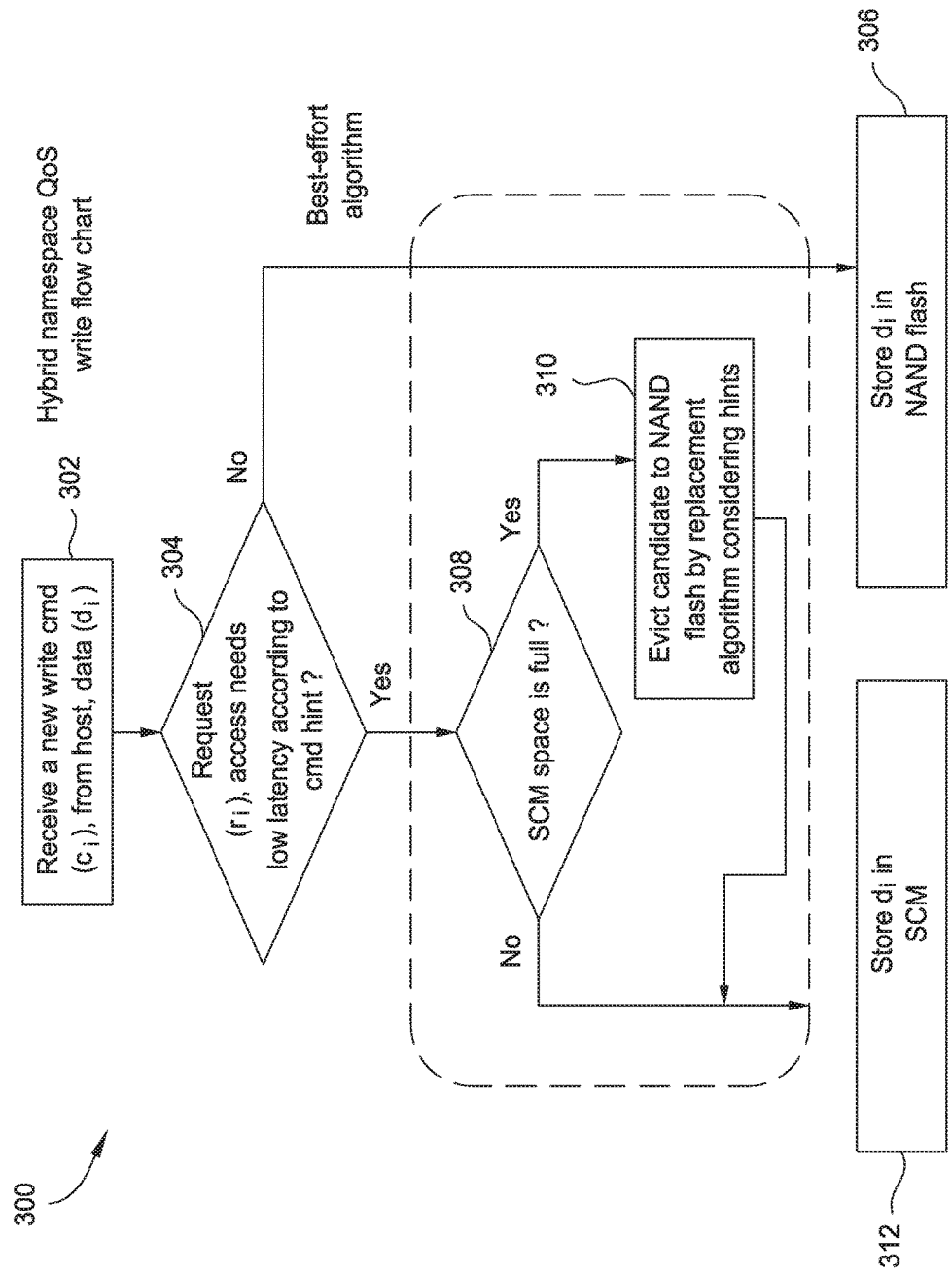
FIG. 3 is a detailed algorithm write flow for an SCM/NAND Flash hybrid SSD for quality of service capabilities of FIG. 1.

Referring to FIG. 3, an algorithm 300 for performing a write operation that exhibits quality of service is provided. The illustrated write flow is but one embodiment that allows for quality of service access to storage class memory 124 as illustrated in FIG. 1. This quality of service capability allows a system 100 that uses this algorithm to accurately write data to a high degree of quality of service for the user. As illustrated, warnings may be raised to the host 114 in instances where there is insufficient storage class memory 124 resource for latency critical input and output services. For multiple namespace support (fast namespace, slow namespace) in the hybrid SSD, the user may have the option to specify a ratio of the storage class memory 124 and NAND flash memory 122 for each namespace. To minimize starvation situations from occurring, new data submitted to the storage class memory 124 may be low latency to reduce the host 114 pressure on SRAM in the controller 120. Provision of such low latency prevents situations of command starvation due to SRAM starvation.

In FIG. 3, the controller 120 in the device 126 receives a new write command ($c_i$) from the host 114 at 302. The write command may have data ($d_i$) associated with the command. In 304, the write command is evaluated to determine if there is a request ($r_i$) for low latency according to a command hint. If there is no request ($r_i$) for low latency, then the data ($d_i$) is stored in NAND flash 306. If there is a request for low latency according to the command hint, a query is performed in 308 to determine if the storage class memory 124 is full or if there is enough remaining space in the storage class memory 124 for storing the data ($d_i$). If the result of the query in 308 is that the storage class memory 124 is not full, then the data ($d_i$) is stored in the storage class memory 124 at 312. If there is not enough space in the storage class memory 124 for storing the data ($d_i$) or the storage class memory 124 is already full, then a candidate may be evicted to NAND flash 310 by a replacement algorithm considering hints, such as that discussed in relation to FIG. 6, described later.

Figure 4:
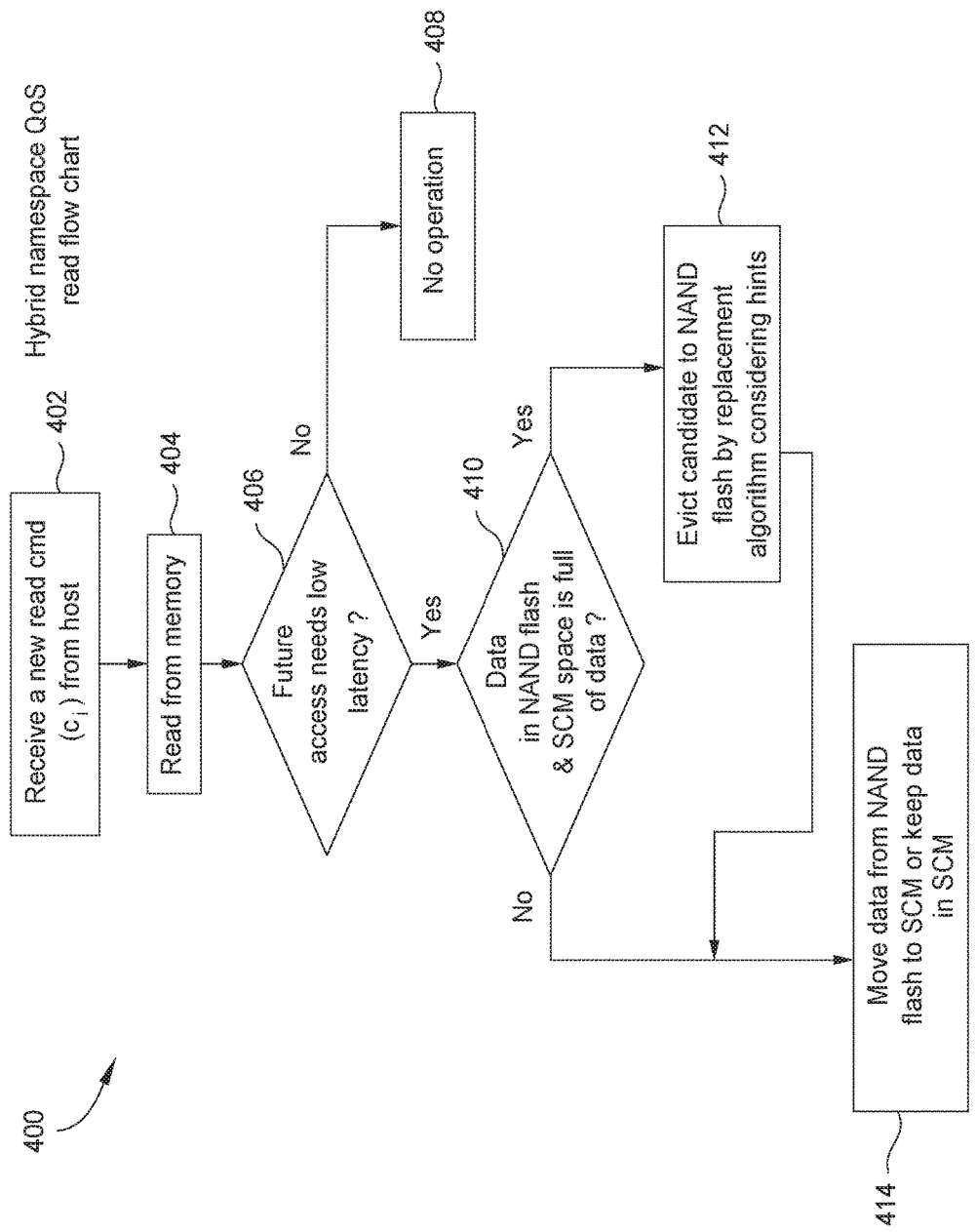
FIG. 4 is a hybrid SSD best-effort algorithm read flow chart for quality of service capabilities of FIG. 1.

Referring to FIG. 4, a hybrid SSD algorithm read flow chart 400 for quality of service operations is illustrated. In this embodiment, a controller, such as a controller 120 in FIG. 1, receives a read command 402 ($c_i$) from the host 114. At 404, the memory (either NAND flash, or storage class memory) is read. To ensure future capabilities are optimal, a query 406 is run to determine if future access to the data needs a low latency. If, no future access low latency needs are found, no further operations are necessary and the operations stop at 408. If future low latency access needs are required, a query is run at 410 to determine if data in the NAND flash 122 and storage class memory 124 is full of data. If the data in the NAND flash 122 and storage class memory 124 is not full and there is sufficient room for data be stored, then data is moved from NAND flash 122 to the storage class memory 124 at 414 or if the data is already in the storage class memory 124, the data is kept in the storage class memory 124. If in 410 the NAND flash 122 and storage class memory 124 space is full of data, then there is a need to perform other operations of evicting a candidate to NAND flash 122 by a replacement algorithm considering hints at 412 and described further in relation to FIG. 6.

Referring to FIG. 5, a table of command attributes is provided. The command attributes specify a set of rules for the controller 120 to determine data that should be moved (eviction victims) from the storage class memory 124. This data, for example, is the data that should be moved under 310 in FIG. 3 or 412 in FIG. 4. Attribute codes that are shown are an example 8 bit data sources. As a non-limiting example embodiment, the code could be a read or write (bit 1), sequential or random identified (bit 2), latency high or latency low (bit 3), read frequency high or low (bit 4), write frequency high or low (bit 5), read in the future (bit 6), write in the future (bit 7) and a future reserved bit (bit 8). These bit data show input/output characteristics and may be obtained from data set management parsing. The data having a correct attribute code, quality of service and performance may be enhanced for a user as data may be stored in memory, either storage class memory 124 or NAND flash memory 122 that is more closely aligned to the proper data type.

Figure 6:
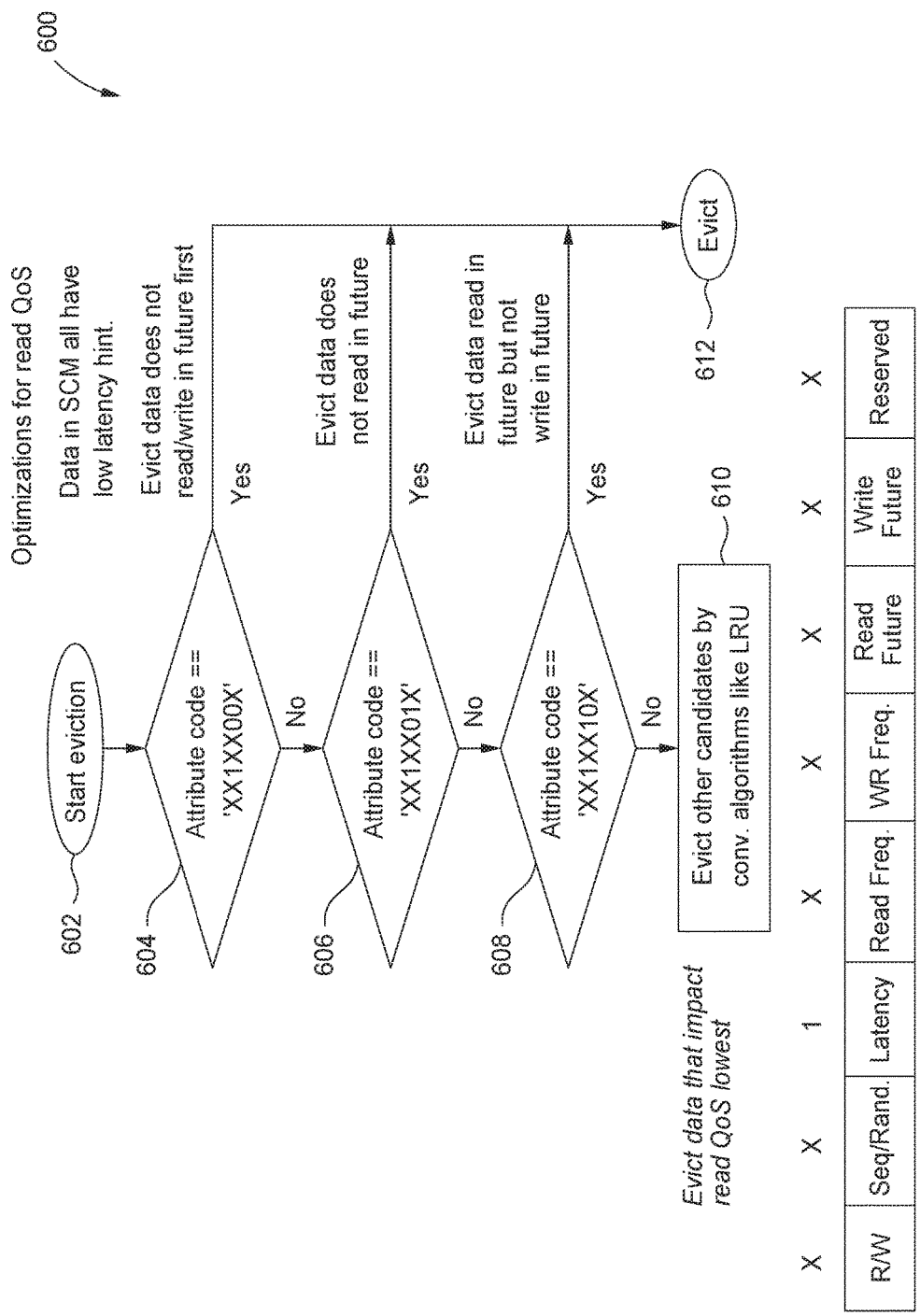
FIG. 6 is a data replacement algorithm considering hints for quality of service capabilities of FIG. 1.

Referring to FIG. 6, a data replacement algorithm 600 is presented where an application requirement of read latency quality of service is needed. As described previously in 412 and 310, candidates for eviction from the storage class memory 124 to NAND flash 122 may be identified and moved. The eviction process is started 602 and a query is run at 604 to determine if the attribute code is equal to XX1XX00X. If this query is true, then such associated data is evicted 612 from the storage class memory 124 to the NAND flash 122. If the attribute code does not have both a no future read and no future write designation, an additional query is run at 606 to see if the attribute code is equal to XX1XX01X. Such an attribute code, as provided at the bottom of FIG. 6 would indicate that both a read future is not indicated and that a write future is indicated. If at query 606 the answer is yes, the data does not require a read in the future. This would cause the data with this attribute to be evicted from the storage class memory 124 to the NAND flash memory 122 at 612. If at query 606 the answer is no, then a further attribute code is checked at query 608 to determine if the attribute code is equal to XX1XX10X. Such an attribute code, as provided at the bottom of FIG. 6 would indicate that data that would be only read in the future but not written in the future. If such a query is true at 608, then this data would be evicted from the storage class memory 124 to the NAND flash 122 at 612. If such a query is not true at 610, then other candidates may be evicted by conventional algorithms. As a non-limiting example of conventional algorithms being used such as an LRU algorithm (least recently used).

Storage class memory 124 may also be scanned or maintained to enhance system performance. Hardware logic may be used as an accelerator to match storage class memory 124 data attribute codes. If a discrepancy is found in the attribute codes of data on the storage class memory 124, such data may be evicted to the NAND flash 122 for storage either directly or through the controller 120. Such hardware logic may be through use of comparators.

In one non-limiting embodiment, a device is disclosed having a controller configured to interface with a host, a storage class memory configured to interface with the controller and a flash memory configured to interface with the controller, wherein both the storage class memory and the flash memory are configured to store data, and wherein the controller is configured to separate the data according to latency critical data and non-latency critical data.

In another embodiment, the device may be configured such that the interface between the host and the controller is by NVMe standards.

In another embodiment, the device may be configured wherein the interface between the host and the controller includes a capability to read data set management hints.

In another embodiment, the device may be configured wherein the latency crucial data is stored in the storage class memory.

In another embodiment, the device may be configured wherein the storage class memory is connected to the flash memory.

In another embodiment, the device may be configured wherein the controller is configured with an interface with PCIe, PCI, PCI-X, AGP or NVME standards.

In another embodiment, the device may be configured wherein the storage class memory is one of resistive random access memory, phase change memory and magneto-resistive random access memory.

In another embodiment, the device may be configured wherein the flash memory is a NAND flash memory.

In another embodiment, the device may be configured wherein the flash memory is constructed from one of single level cell, multi-level cell, and triple level cell units.

In another embodiment, the device may be configured wherein the controller is configured with an algorithm for evicting data from the storage class memory according to a data set management hint.

In another embodiment, the device may be configured wherein the storage class memory is one of resistive random access memory, phase change memory, magneto-resistive random access memory and non-volatile memory.

In another embodiment, the device may be configured wherein the host is a computer.

In another embodiment, the device may be configured wherein the data with a fast namespace is stored in the storage class memory and the data with a slow namespace is stored in the flash memory.

In another embodiment, a method for reading data is disclosed reciting receiving a read command from a host, reading data from a memory, determining if the data has a low latency data set management hint, storing the data in a flash memory when the data does not have a low latency data set management hint and storing the data in a storage class memory when the data has a low latency data set management hint.

In another embodiment, the method for reading data may further comprise determining a presence of unused memory over a size of the data in both the flash memory and the storage class memory, and moving a set of data from the storage class memory to the flash memory when a replacement algorithm determines an eviction proceeding and the flash memory and the storage class memory are full.

In a further embodiment, a method for writing data is disclosed reciting receiving a write command from a host, determining if the data has a low latency data set management hint, writing the data in a flash memory when the data does not have a low latency data set management hint, determining a presence of unused memory over a size of the write data in both the flash memory and a storage class memory, moving a set of data from the storage class memory to the flash memory when a replacement algorithm determines an eviction proceeding and the flash memory and the storage class memory are full and writing the data in the storage class memory when the data has a low latency data set management hint.

In a further embodiment a method is comprising checking an attribution code of data in a first memory and moving the data from the first memory to a second memory when the attribution code indicates that the data is required to be stored in a memory with specific attributes and the second memory has the specific attributes compared to the first memory.

In a further embodiment, the method recites that the attribution code is at least one of a read in the future attribute, a write in the future attribute, a read frequency attribute, a write frequency attribute.

In a further embodiment, the method recites that the attribution code is a latency attribute.

In a further embodiment, a device is disclosed having a means for receiving a write command from a host, means for determining when data has a low latency data set management hint, means for writing the data in a flash memory when the data does not have a low latency data set management hint, means for determining a presence of unused memory over a size of the write data in both the flash memory and a storage class memory, means for moving a set of data from the storage class memory to the flash memory when a replacement algorithm determines an eviction proceeding and the flash memory and the storage class memory are full and means for writing the data in the storage class memory when the data has a low latency data set management hint.

Through the above-identified configuration and methods described, the overall quality of service of a user may be increased. As an example bit rate processing may be increased, transmission delay may be minimized and throughput of the computer system increased. The embodiments described provide custom interfaces, architecture and algorithms that enable an increased quality of service. Although described as a combination of an interface, architecture and algorithm, each of these may be used singularly or in combination with any of the others and with conventional systems. As an example, a custom architecture and algorithm may be utilized.

Although described as providing a custom interface to pass data characteristic hints from a host to a SSD, such interface may in fact be a multitude of interfaces, with each interface capable of transmitting and receiving information along a parallel network. Such interface/interfaces may be created to maximize efficiency of SSD operations by creating a logical framework upon which data is stored, retrieved (read operations), written and erased.

In a further example embodiment the method may be accomplished wherein the host is one of a personal computer and a server.

In a further example embodiment, the method may further comprise checking a size of empty memory in the second memory prior to moving the data.

In a further example embodiment, any of the method may be accomplished further comprising notifying a user of a completion of the moving of data from the first memory to the second memory.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A device, comprising:
    a controller configured to interface with a host;
    a storage class memory configured to interface with the controller; and
    a flash memory configured to interface with the controller, wherein both the storage class memory and the flash memory are configured to store data, and wherein the controller is configured to separate the data according to a read or write bit, a sequential or random identified bit, a latency high or latency low bit, a read frequency high or low bit, a write frequency high or low bit, a read in the future bit, and a write in the future bit.

2. The device according to claim 1, wherein the interface between the host and the controller is by NVMe standards.

3. The device according to claim 1, wherein the interface between the host and the controller includes a capability to read data set management hints.

4. The device according to claim 1, wherein latency crucial data is stored in the storage class memory.

5. The device according to claim 1, wherein the storage class memory is connected to the flash memory.

6. The device according to claim 1, wherein the controller is configured with an interface with PCIe, PCI, PCI-X, AGP or NVME standards.

7. The device according to claim 1, wherein the storage class memory is one of resistive random access memory, phase change memory and magneto-resistive random access memory.

8. The device according to claim 1, wherein the flash memory is a NAND flash memory.

9. The device according to claim 1, wherein the flash memory is constructed from one of single level cell, multi-level cell, and triple level cell units.

10. The device according to claim 1, wherein the controller is configured with an algorithm for evicting data from the storage class memory according to a data set management hint.

11. The device according to claim 1, wherein the storage class memory is one of resistive random access memory, phase change memory, magneto-resistive random access memory and non-volatile memory.

12. The device according to claim 1, wherein the host is a computer.

13. The device according to claim 1, wherein the data with a fast namespace is stored in the storage class memory and the data with a slow namespace is stored in the flash memory.

14. A method, comprising:
    checking an attribution code of data in a first memory wherein the data includes a read or write bit, a sequential or random identified bit, a latency high or latency low bit, a read frequency high or low bit, a write frequency high or low bit, a read in the future bit, and a write in the future bit; and
    moving the data from the first memory to a second memory when the attribution code indicates that the data is required to be stored in a memory with specific attributes and the second memory has the specific attributes compared to the first memory.

15. The method according to claim 14, wherein the attribution code is at least one of a read in the future attribute, a write in the future attribute, a read frequency attribute, a write frequency attribute.

16. The method according to claim 14, wherein the attribution code is a latency attribute.

17. A method for reading data, comprising:
    receiving a read command from a host;
    reading data from a memory, wherein the data includes a read or write bit, a sequential or random identified bit, a latency high or latency low bit, a read frequency high or low bit, a write frequency high or low bit, a read in the future bit, and a write in the future bit;
    determining if the data has a low latency data set management hint;
    storing the data in a flash memory when the data does not have a low latency data set management hint; and
    storing the data in a storage class memory when the data has a low latency data set management hint.

18. The method according to claim 17, further comprising:
    determining a presence of unused memory over a size of the data in both the flash memory and the storage class memory; and
    moving a set of data from the storage class memory to the flash memory when a replacement algorithm determines an eviction proceeding and the flash memory and the storage class memory are full.

19. A method for writing data, comprising:
    receiving a write command from a host;
    determining if the data has a low latency data set management hint;

writing the data in a flash memory when the data does not have a low latency data set management hint;
determining a presence of unused memory over a size of the write data in both the flash memory and a storage class memory;
moving a set of data from the storage class memory to the flash memory when a replacement algorithm determines an eviction proceeding and the flash memory and the storage class memory are full; and
writing the data in the storage class memory when the data has a low latency data set management hint; wherein the data has a read or write bit, a sequential or random identified bit, a latency high or latency low bit, a read frequency high or low bit, a write frequency high or low bit, a read in the future bit, and a write in the future bit.

* * * * *